(12) United States Patent
Yeh et al.

(10) Patent No.: US 9,027,896 B2
(45) Date of Patent: May 12, 2015

(54) SUPPORT BRACKET

(71) Applicant: Wistron Corporation, New Taipei (TW)

(72) Inventors: Ping-Sheng Yeh, New Taipei (TW); Chia-Sheng Lin, New Taipei (TW); Shin-Yi Hsieh, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 17 days.

(21) Appl. No.: 14/147,591

(22) Filed: Jan. 6, 2014

(65) Prior Publication Data

US 2015/0060622 A1    Mar. 5, 2015

(30) Foreign Application Priority Data

Sep. 5, 2013    (TW) .............................. 102132043 A

(51) Int. Cl.
*A47F 5/00*    (2006.01)
*F16M 13/02*    (2006.01)

(52) U.S. Cl.
CPC .................................... *F16M 13/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,310,050 | B2 * | 12/2007 | Yeh ........................... | 340/815.83 |
| 7,967,269 | B2 * | 6/2011 | Liu ............................ | 248/287.1 |
| 8,118,272 | B2 * | 2/2012 | Liou ......................... | 248/287.1 |
| 8,240,628 | B2 * | 8/2012 | Huang ....................... | 248/316.1 |
| 8,833,716 | B2 * | 9/2014 | Funk et al. ................. | 248/316.4 |
| 2006/0215836 | A1 * | 9/2006 | Wang ........................... | 379/455 |
| 2007/0284500 | A1 * | 12/2007 | Fan .......................... | 248/346.06 |
| 2010/0073857 | A1 * | 3/2010 | Lin et al. .................. | 361/679.27 |
| 2012/0212911 | A1 * | 8/2012 | Chiang ........................ | 361/748 |
| 2012/0312936 | A1 * | 12/2012 | Huang ....................... | 248/122.1 |
| 2013/0037671 | A1 * | 2/2013 | Iu et al. ...................... | 248/286.1 |

* cited by examiner

*Primary Examiner* — Monica Millner
(74) *Attorney, Agent, or Firm* — Winston Hsu; Scott Margo

(57) ABSTRACT

A support bracket includes a housing, a driving member, a first linking member, a gear mechanism, a first engaging member, a second linking member and a second engaging member. The housing has a guiding rail and a through hole. The driving member has a driving portion and a first rack portion, and the driving portion is exposed out of the housing. The first linking member has a second rack portion and an engaging groove. The gear mechanism meshes with the first rack portion and the second rack portion. The first engaging member has a guiding portion and a first engaging portion, and the guiding portion is disposed in the guiding rail. Opposite ends of the second linking member are pivotally connected to the first linking member and the first engaging member, respectively. The second engaging member has a second engaging portion.

15 Claims, 14 Drawing Sheets

SUPPORT BRACKET

BACKGROUND OF THE INVENTION

1. Field of the Invention

The invention relates to a support bracket and, more particularly, to a support bracket allowing a user to attach/detach an electronic device thereto/therefrom rapidly.

2. Description of the Prior Art

As technology advances and develops, various electronic devices, such as mobile phone, personal digital assistant, tablet computer, and so on, have been used in daily life widely. Under some situations, a user may place the electronic device on a support frame, such that an appropriate operation/viewing angle is formed between the electronic device and the user. In general, the electronic device is fixed on the conventional support frame by a screwed manner. However, it is complicated and inconvenient for the user to attach/detach the electronic device to/from the conventional support frame by the screwed manner. Furthermore, if the user cannot find a suitable screwdriver provisionally, he/she cannot attach/detach the electronic device to/from the conventional support frame accordingly.

SUMMARY OF THE INVENTION

The invention provides a support bracket allowing a user to attach/detach an electronic device thereto/therefrom rapidly, so as to solve the aforesaid problems.

According to an embodiment of the invention, a support bracket comprises a housing, a driving member, a first linking member, a gear mechanism, a first engaging member, a second linking member and a second engaging member. The housing has a guiding rail and a through hole, and the guiding rail is located in the housing. The driving member is movably disposed in the housing and has a driving portion and a first rack portion, and the driving portion is exposed out of the housing. The first linking member is movably disposed in the housing and has a second rack portion and an engaging groove. The gear mechanism is disposed in the housing and meshes with the first rack portion and the second rack portion. The first engaging member is movably disposed in the housing and has a guiding portion and a first engaging portion, and the guiding portion is disposed in the guiding rail. The second linking member is disposed in the housing, and opposite ends of the second linking member are pivotally connected to the first linking member and the first engaging member, respectively. The second engaging member is rotatably disposed in the housing and has a second engaging portion. Before the driving portion is pressed, the first engaging portion is retracted into the housing from the through hole. When the driving portion is pressed, the driving member drives the first engaging member to move along the guiding rail through a cooperation between the first rack portion, the gear mechanism, the second rack portion and the second linking member, such that the first engaging portion protrudes out of the housing from the through hole and the second engaging portion is engaged with the engaging groove.

In this embodiment, the support bracket may further comprise a button and a first resilient member. The button is movably disposed in the housing and used for pushing the second engaging member to rotate, so as to disengage the second engaging portion from the engaging groove. Opposite ends of the first resilient member are connected to the housing and the driving member, respectively. When the second engaging portion is disengaged from the engaging groove, the first resilient member generates an elastic force for pulling the driving member to move. Afterwards, the driving member drives the first engaging member to move along the guiding rail through a cooperation between the first rack portion, the gear mechanism, the second rack portion and the second linking member, such that the first engaging portion is retracted into the housing from the through hole.

As mentioned in the above, when a user wants to attach the electronic device to the support bracket, he/she only needs to press the driving portion of the driving member by the bottom of the electronic device. Consequently, the first engaging portion of the first engaging member protrudes out of the housing from the through hole and then is engaged with an engaging groove on a back of the electronic device. Accordingly, the user can attach the electronic device to the support bracket rapidly. Furthermore, when the user pushes the button, the first engaging portion of the first engaging member is disengaged from the engaging groove on the back of the electronic device and then retracted into the housing from the through hole. Accordingly, the user can detach the electronic device from the support bracket rapidly. In other words, the support bracket of the invention allows the user to attach/detach the electronic device thereto/therefrom rapidly without any tools and is very convenient in operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
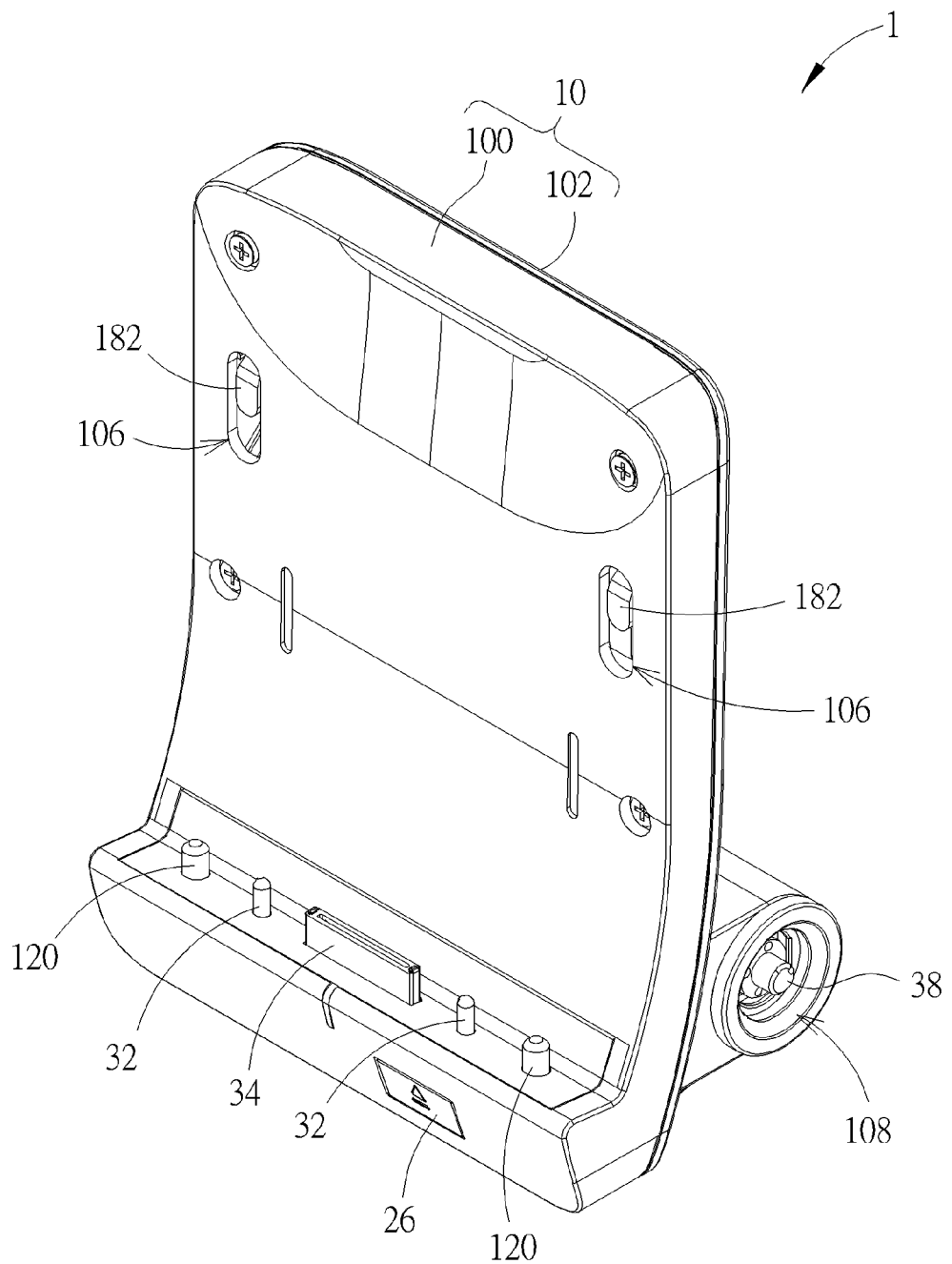
FIG. 1 is a front perspective view illustrating a support bracket according to an embodiment of the invention.
Figure 2:
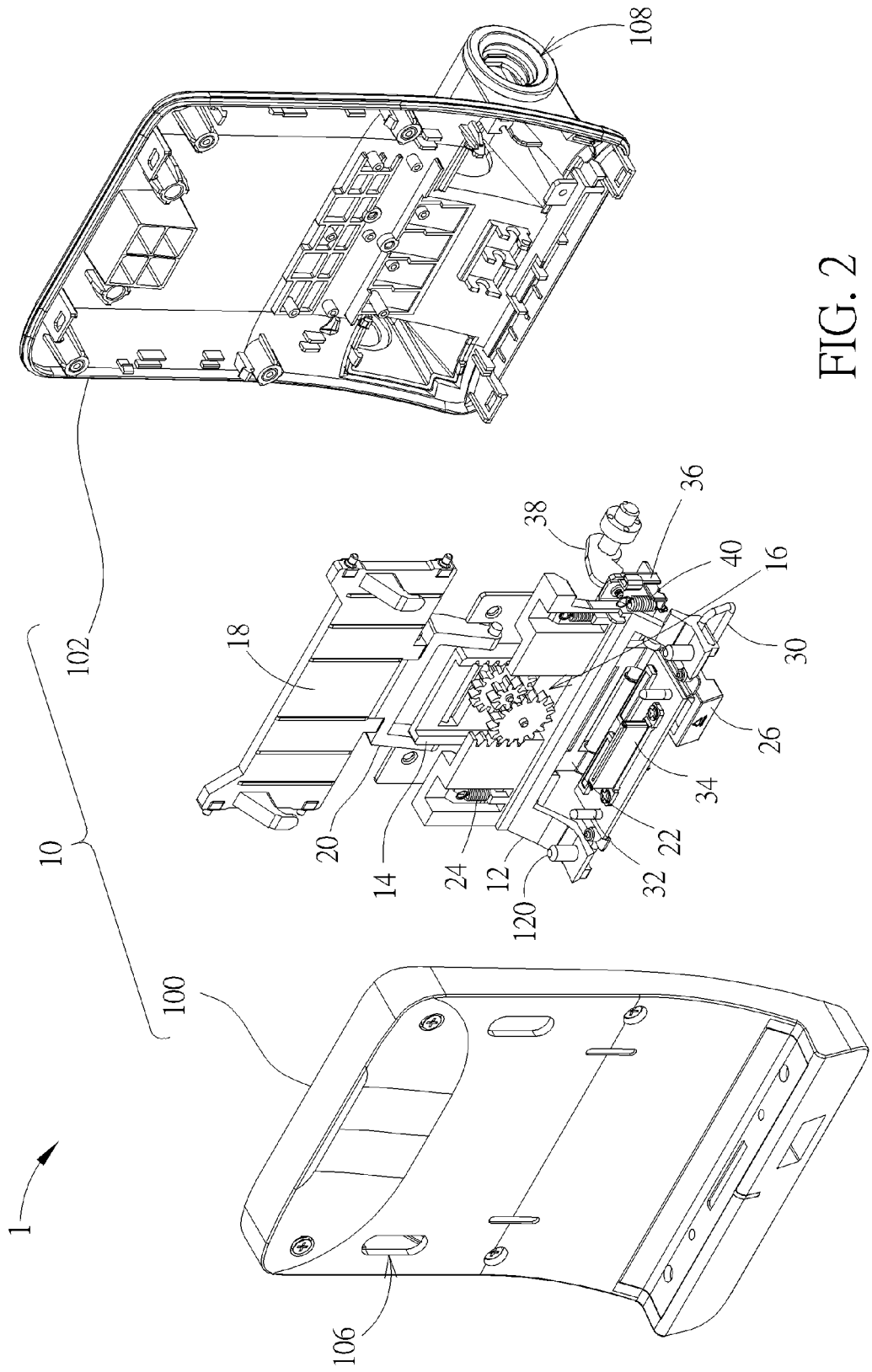
FIG. 2 is a partial exploded view illustrating the support bracket shown in FIG. 1.
Figure 3:
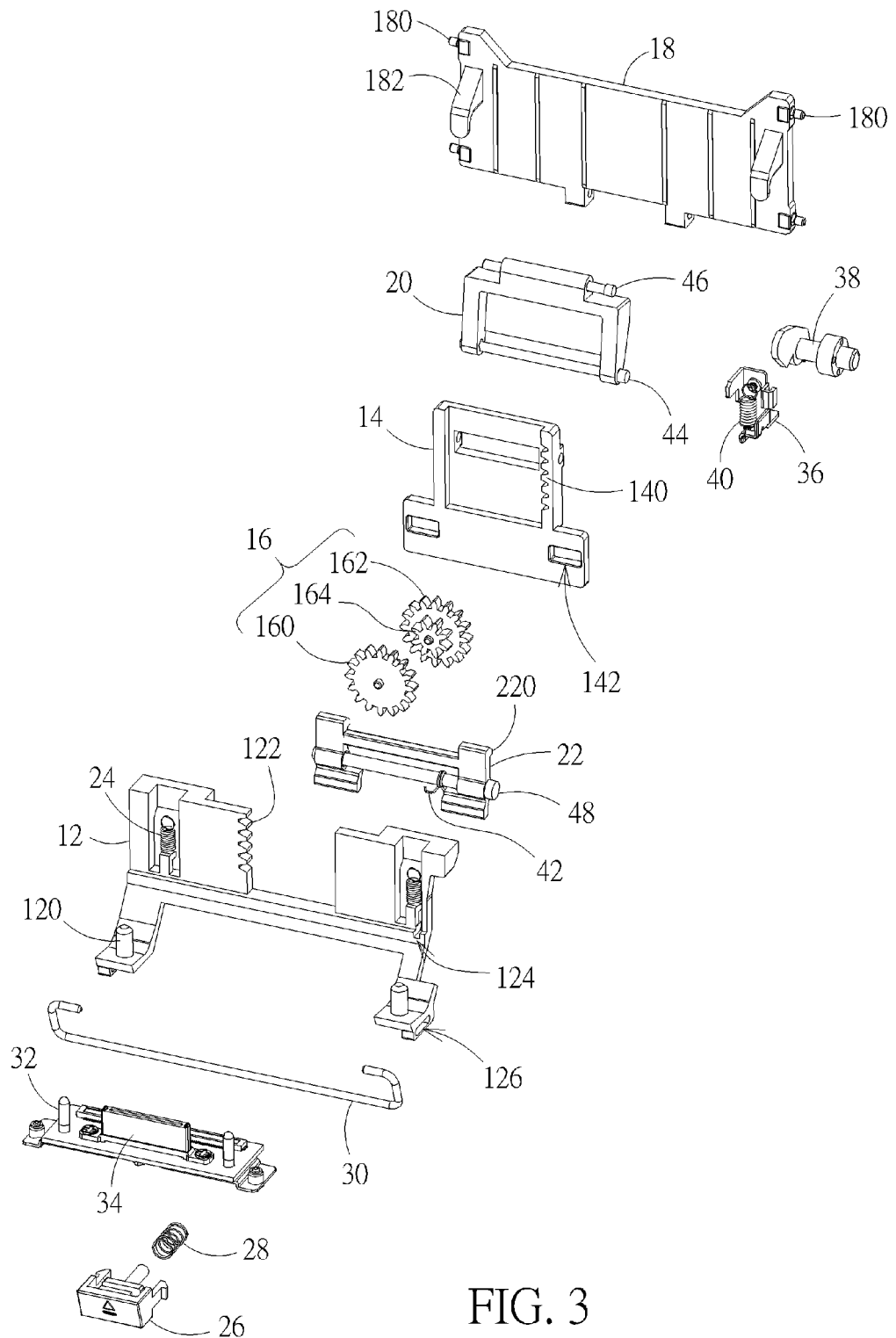
FIG. 3 is an exploded view illustrating the inner components shown in FIG. 2.
Figure 4:
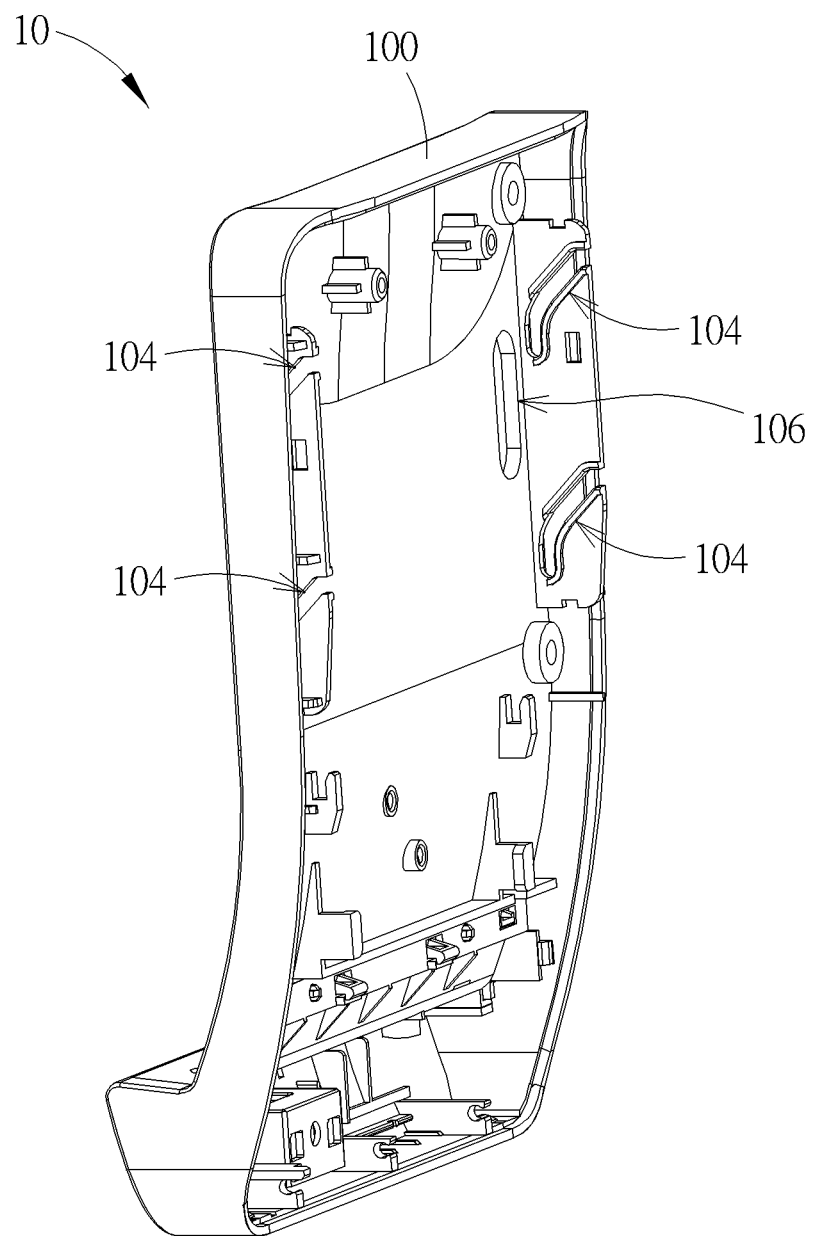
FIG. 4 is a rear perspective view illustrating the front cover shown in FIG. 2.
Figure 5:
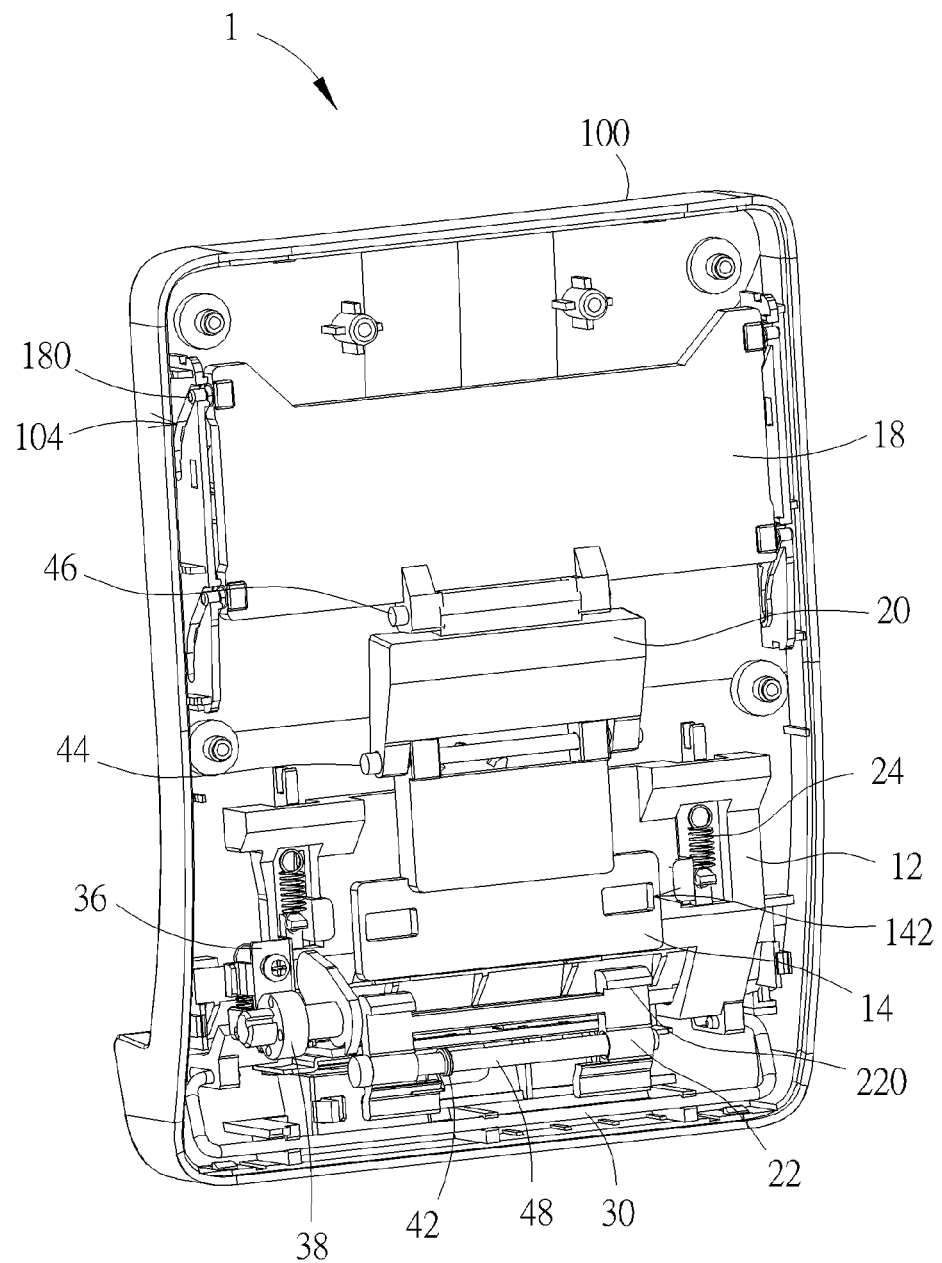
FIG. 5 is a rear perspective view illustrating the support bracket shown in FIG. 1 without the back cover.
Figure 6:
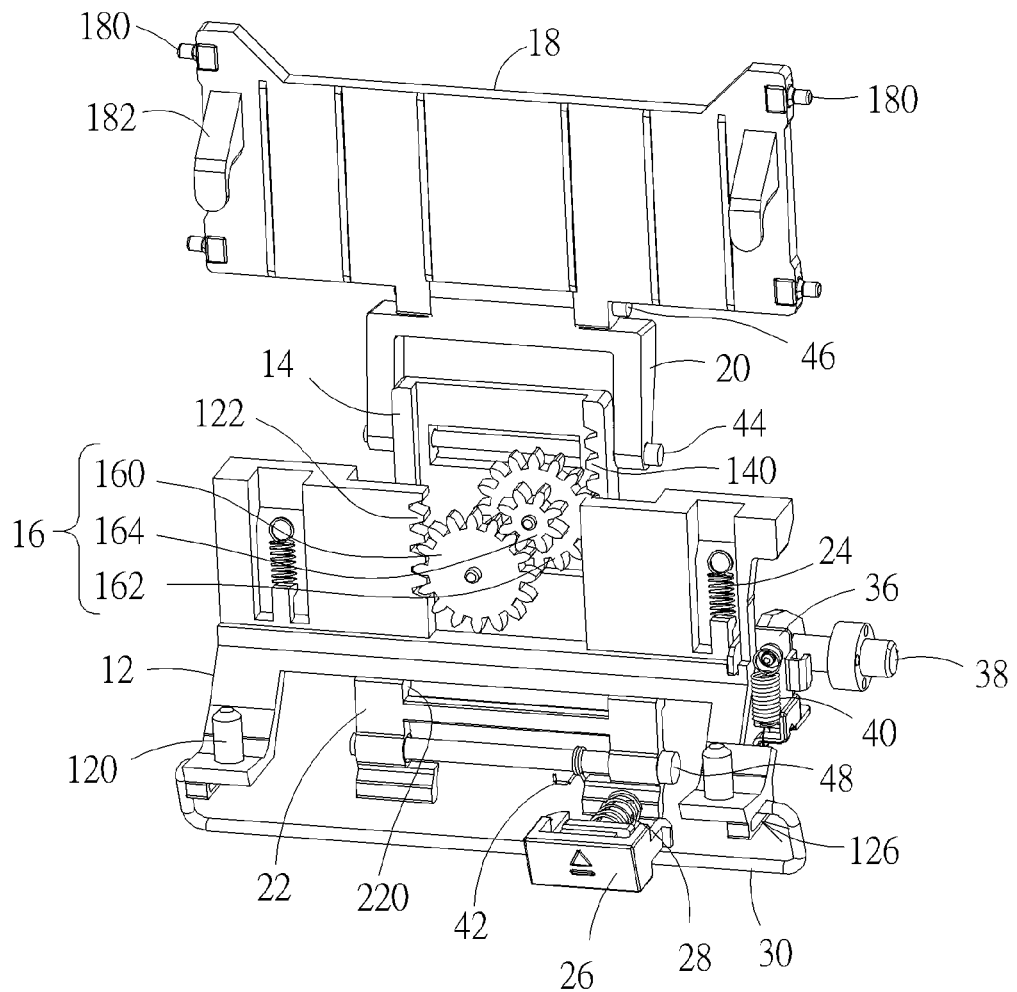
FIG. 6 is a perspective view illustrating the inner components shown in FIG. 2 from another viewing angle.

Referring to FIGS. 1 to 6, FIG. 1 is a front perspective view illustrating a support bracket 1 according to an embodiment of the invention, FIG. 2 is a partial exploded view illustrating the support bracket 1 shown in FIG. 1, FIG. 3 is an exploded view illustrating the inner components shown in FIG. 2, FIG. 4 is a rear perspective view illustrating the front cover 100 shown in FIG. 2, FIG. 5 is a rear perspective view illustrating the support bracket 1 shown in FIG. 1 without the back cover 102, and FIG. 6 is a perspective view illustrating the inner components shown in FIG. 2 from another viewing angle.

As shown in FIGS. 1 to 6, the support bracket 1 of the invention comprises a housing 10, a driving member 12, a first linking member 14, a gear mechanism 16, a first engaging member 18, a second linking member 20, a second engaging member 22, two first resilient members 24, a button 26, a second resilient member 28, a linking rod 30, two positioning pillars 32, an electric connector 34, a lock member 36, a rotating member 38, a third resilient member 40 and a torsion spring 42.

In this embodiment, the housing 10 may comprise a front cover 100 and a back cover 102. As shown in FIGS. 2 and 4, the front cover 100 of the housing 10 has four guiding rails 104 and two through holes 106, wherein the four guiding rails 104 are arranged symmetrically and located in the front cover 100 of the housing 10. Each of the guiding rails 104 is curve-shaped. The driving member 12 is movably disposed in the housing 10. The driving member 12 has two driving portions 120, a first rack portion 122 and a lock recess 124, and the two driving portions 120 are exposed out of the front cover 100 of the housing 10. Opposite ends of each first resilient member 24 are connected to the housing 10 and the driving member 12, respectively. In this embodiment, the first resilient member 24 may be a spring, but not limited to the spring. The linking rod 30 is rotatably disposed in the housing 10, and opposite ends of the linking rod 30 are slidably connected to two sliding grooves 126 on opposite sides of the driving member 12, respectively.

The first linking member 14 is movably disposed in the housing 10. The first linking member 14 has a second rack portion 140 and two engaging grooves 142. The gear mechanism 16 is disposed in the housing 10 and meshes with the first rack portion 122 of the driving member 12 and the second rack portion 140 of the first linking member 14. In this embodiment, the gear mechanism 16 may comprise a first gear 160, a second gear 162 and a third gear 164, wherein the first gear 160 meshes with the first rack portion 122, the second gear 162 meshes with the second rack portion 140, and the third gear 164 is fixed on the second gear 162 and meshes with the first gear 160. Since the third gear 164 is fixed on the second gear 162, the second gear 162 and the third gear 164 rotate synchronously.

The first engaging member 18 is movably disposed in the housing 10. The first engaging member 18 has four guiding portions 180 and two first engaging portions 182. As shown in FIG. 5, the four guiding portions 180 are arranged symmetrically and disposed in the four guiding rails 104 of the housing 10, respectively. The second linking member 20 is disposed in the housing 10, and opposite ends of the second linking member 20 are pivotally connected to the first linking member 14 and the first engaging member 18, respectively. As shown in FIG. 3, opposite ends of the second linking member 20 may be pivotally connected to the first linking member 14 and the first engaging member 18 by two pivots 44, 46, respectively.

The second engaging member 22 is rotatably disposed in the housing 10 and the second engaging member 22 has two second engaging portions 220. As shown in FIG. 3, the second engaging member 22 may be pivotally connected to the housing 10 by a pivot 48. The torsion spring 42 is sleeved on the pivot 48, and opposite ends of the torsion spring 42 are connected to the housing 10 and the second engaging member 22, respectively. The button 26 is movably disposed in the housing 10 and used for pushing the second engaging member 22 to rotate. Opposite ends of the second resilient member 28 are connected to the button 26 and the second engaging member 22, respectively. In this embodiment, the second resilient member 28 may be, but not limited to, a spring. The two positioning pillars 32 protrude from the front cover 100 of the housing 10. The electric connector 34 is disposed on the front cover 100 of the housing 10 and located between the two positioning pillars 32. The lock member 36 is movably disposed in the housing 10 and the rotating member 38 is rotatably disposed in the back cover 102 of the housing 10. Opposite ends of the third resilient member 40 are connected to the housing 10 and the lock member 36, respectively. In this embodiment, the third resilient member 40 may be a spring, but not limited to the spring.

Figure 7:
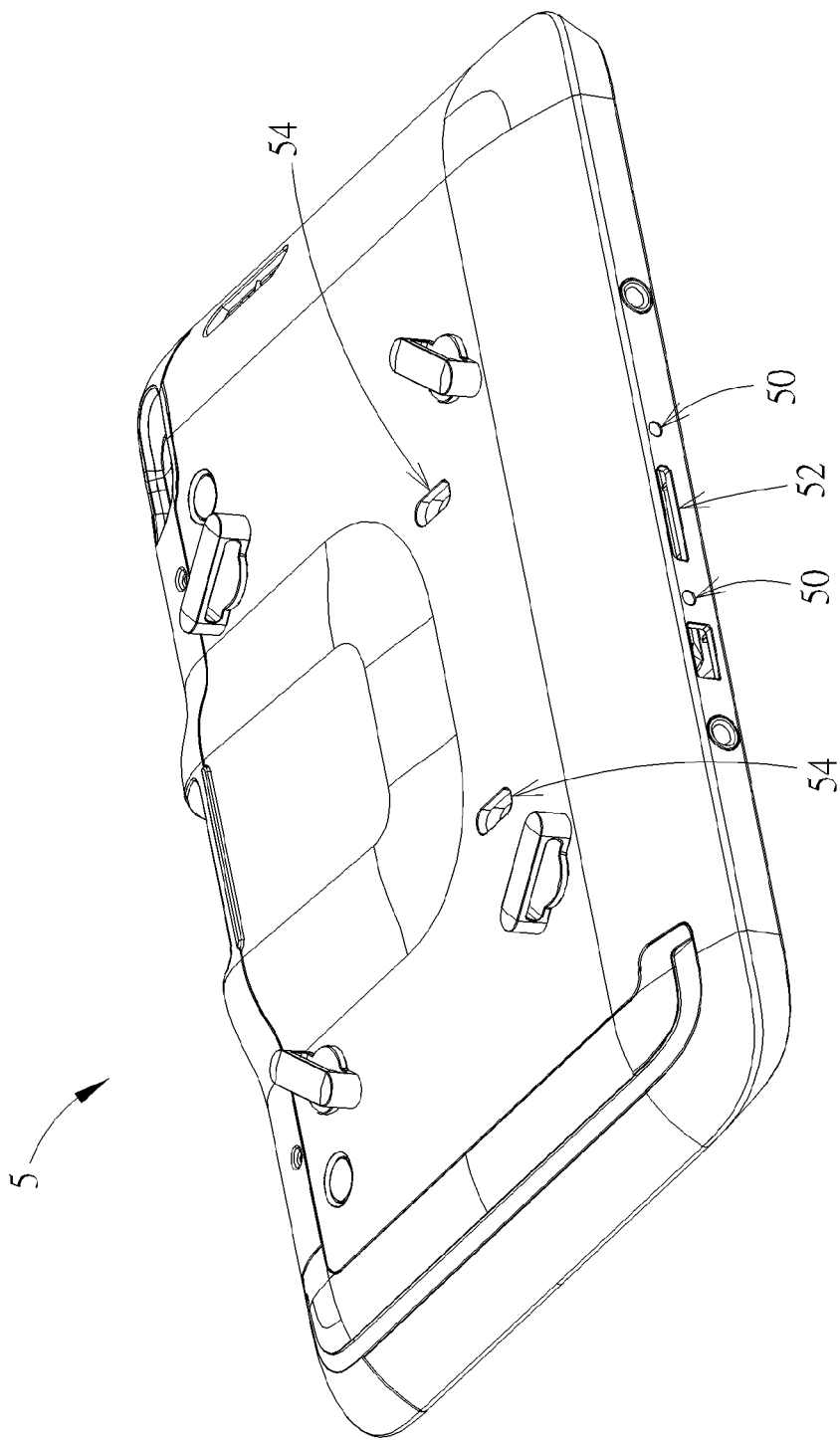
FIG. 7 is a rear perspective view illustrating an electronic device capable of being attached to the support bracket shown in FIG. 1.
Figure 8:
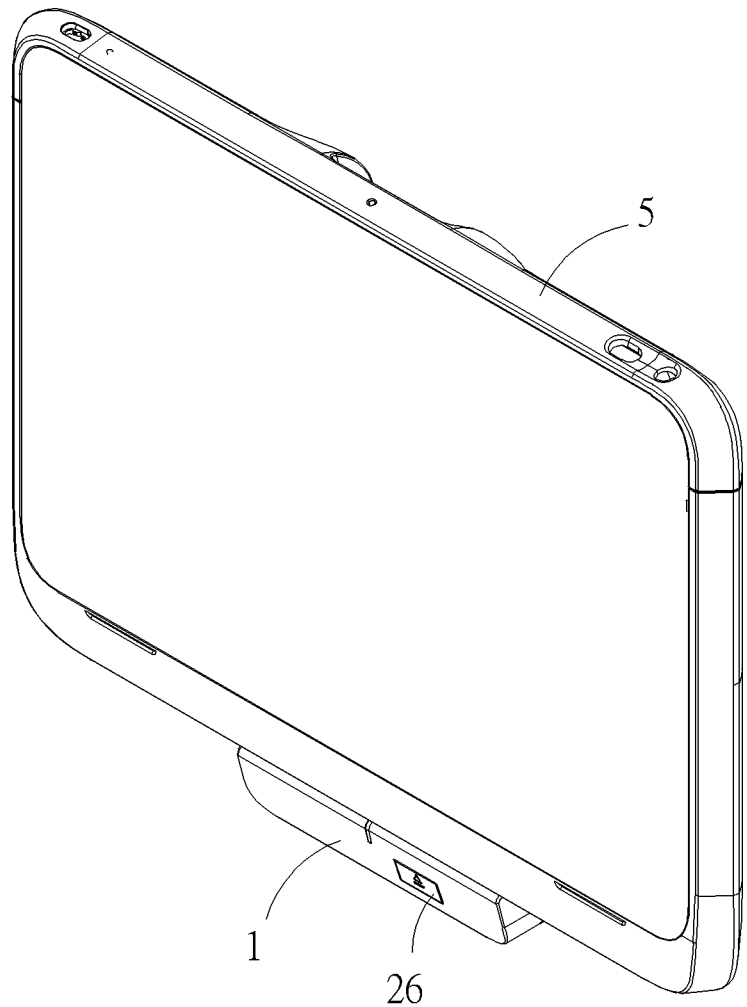
FIG. 8 is a front perspective view illustrating the electronic device shown in FIG. 7 being attached to the support bracket shown in FIG. 1.
Figure 9:
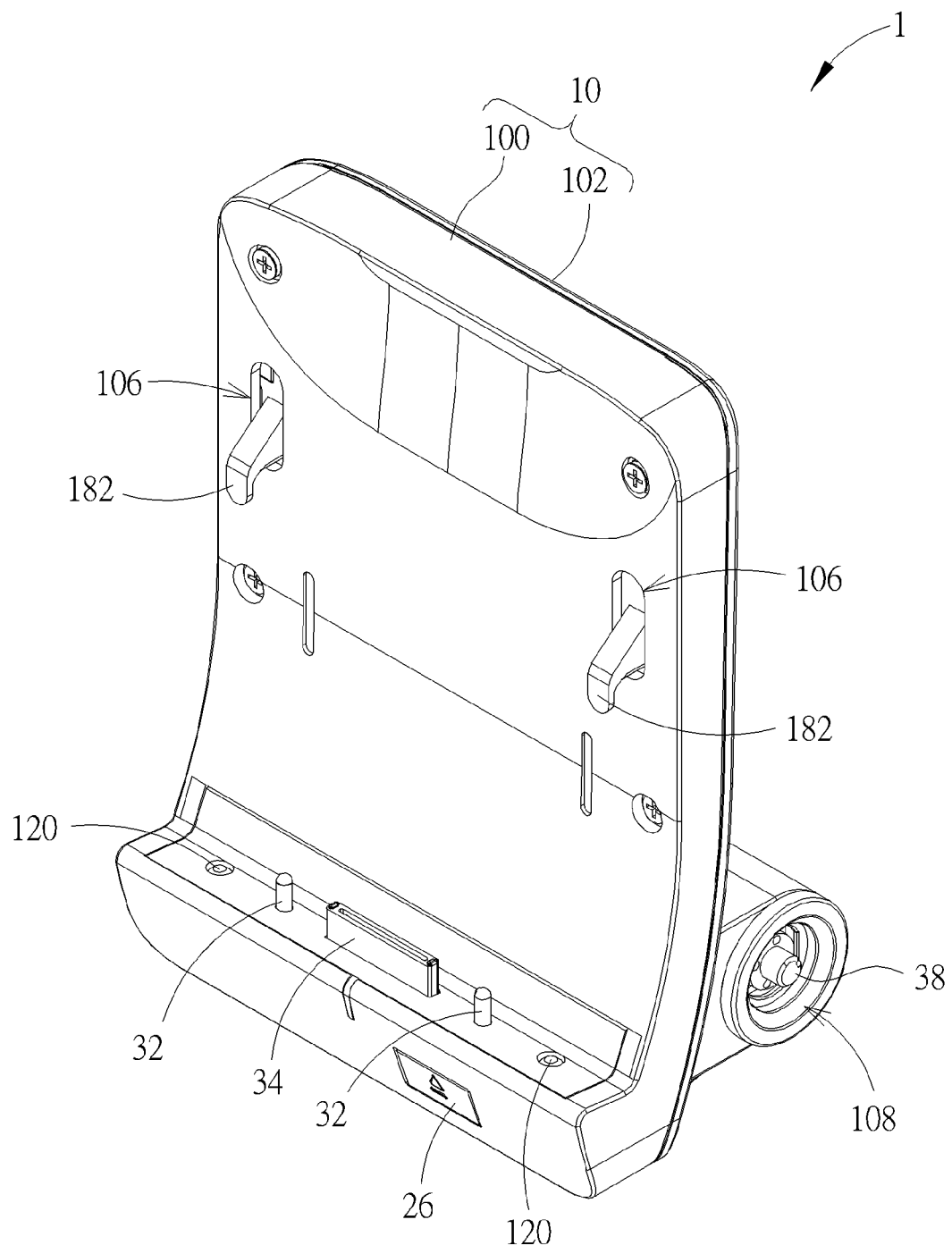
FIG. 9 is a front perspective view illustrating the driving portion of the support bracket shown in FIG. 1 being pressed.
Figure 10:
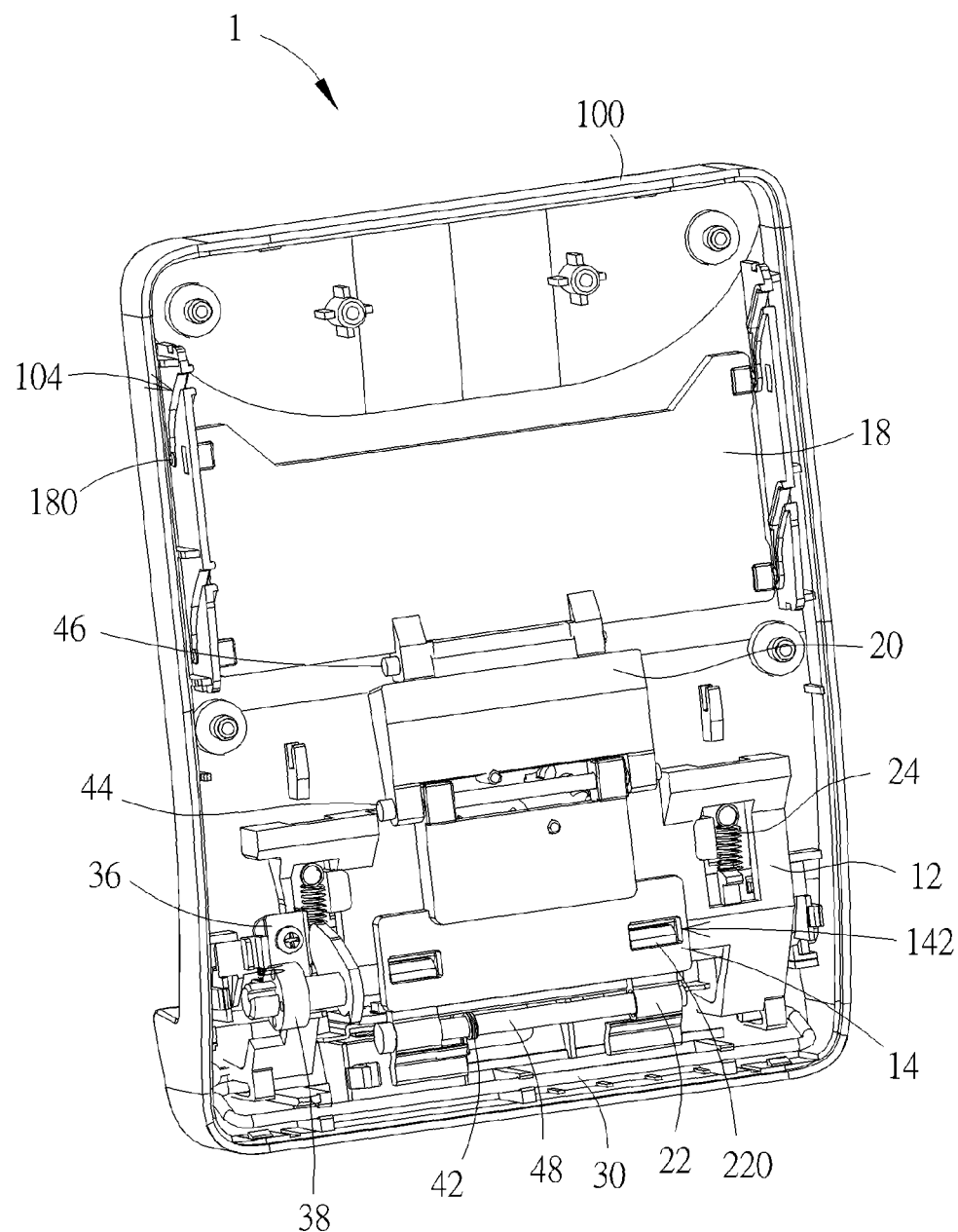
FIG. 10 is a rear perspective view illustrating the support bracket shown in FIG. 1 without the back cover.
Figure 11:
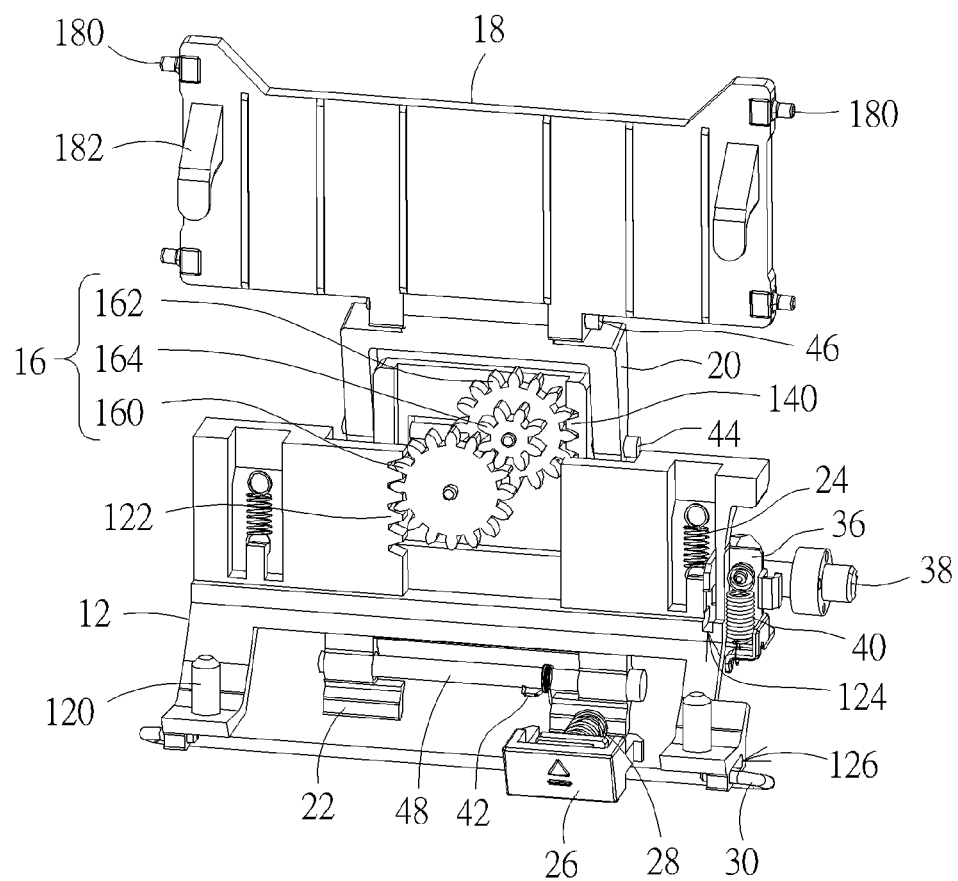
FIG. 11 is a front perspective view illustrating the inner components shown in FIG. 10.
Figure 12:
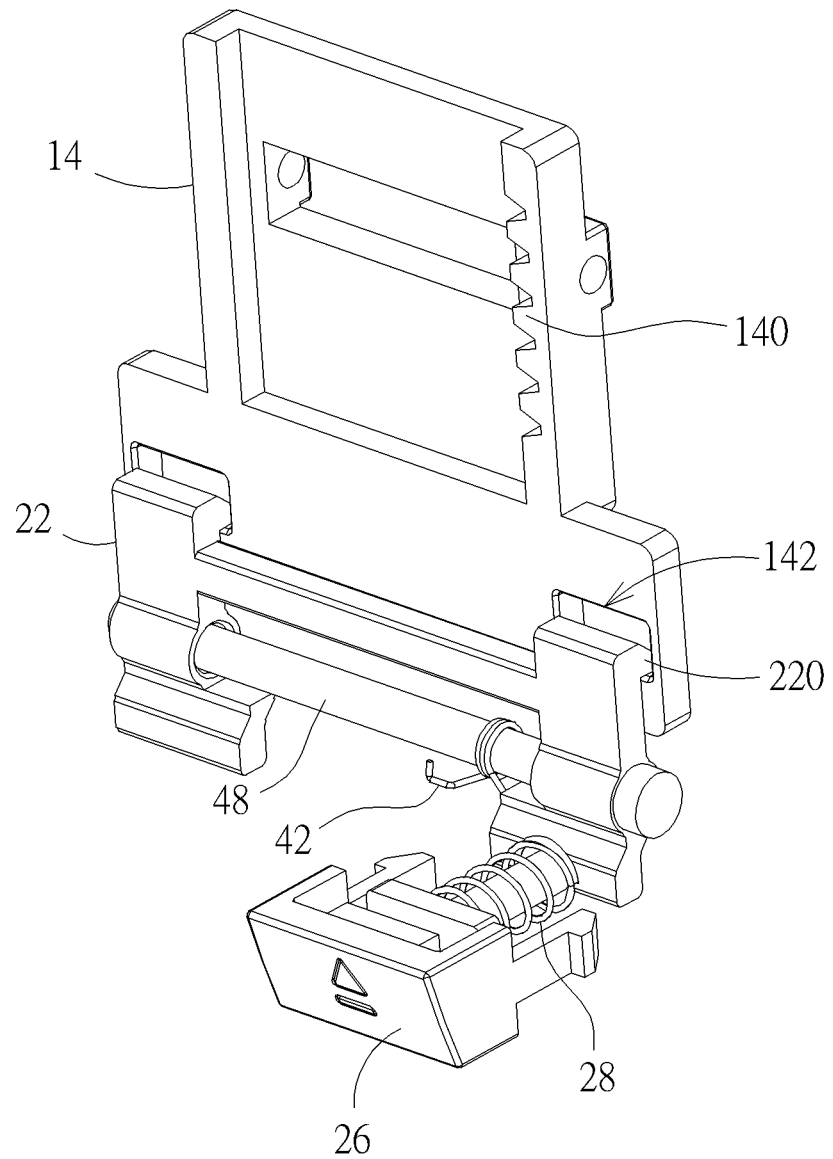
FIG. 12 is a perspective view illustrating the second engaging member and the first linking member shown in FIG. 11 being engaged with each other.

Referring to FIGS. 7 to 12 at the same time, FIG. 7 is a rear perspective view illustrating an electronic device 5 capable of being attached to the support bracket 1 shown in FIG. 1, FIG. 8 is a front perspective view illustrating the electronic device 5 shown in FIG. 7 being attached to the support bracket 1 shown in FIG. 1, FIG. 9 is a front perspective view illustrating the driving portion 120 of the support bracket 1 shown in FIG. 1 being pressed, FIG. 10 is a rear perspective view illustrating the support bracket 1 shown in FIG. 1 without the back cover 102, FIG. 11 is a front perspective view illustrating the inner components shown in FIG. 10, and FIG. 12 is a perspective view illustrating the second engaging member 22 and the first linking member 14 shown in FIG. 11 being engaged with each other.

As shown in FIG. 7, the bottom of the electronic device 5 has two positioning holes 50 and a connecting port 52 and the back of the electronic deice 5 has two engaging grooves 54, wherein the two positioning holes 50 are corresponding to the two positioning pillars 32 of the support bracket 1, the connecting port 52 is corresponding to the electric connector 34 of the support bracket 1, and the two engaging grooves 54 are corresponding to the two through holes 106 of the support bracket 1. As shown in FIG. 1, before the driving portion 120 is pressed, the first engaging portion 182 is retracted into the housing 10 from the through hole 106. When a user wants to attach the electronic device 5 to the support bracket 1, he/she needs to align/insert the two positioning pillars 32 and the electric connector 34 of the support bracket 1 with/into the two positioning holes 50 and the connecting port 52 on the bottom of the electronic device 5 and then pushes the driving portion 120 by the bottom of the electronic device 5. After inserting the two positioning pillars 32 and the electric connector 34 into the two positioning holes 50 and the connecting port 52, the two engaging grooves 54 on the back of the electronic device 5 are aligned with the two through holes 106 of the support bracket 1. The electronic device 5 can communicate with the electric connector 34 through the connecting port 52, so as to transmit signals.

In the following, FIGS. 1, 5, 6 and 9-12 are used to depict the operation principle of the support bracket 1 of the invention, wherein FIGS. 1, 5 and 6 illustrate that the position relation between the components before the driving portion 120 is pressed and FIGS. 9-11 illustrate that the position relation between the components after the driving portion 120 is pressed. When the driving portion 120 is pressed, the driving member 12 will move downwardly, such that the first rack portion 122 drives the gear mechanism 16 to rotate. Afterwards, the second gear 162 of the gear mechanism 16 cooperates with the second rack portion 140 to drive the first linking member 14 to move downwardly. Then, the second linking member 20 is driven by the first linking member 14 to move, so as to drive the first engaging member 18 to move along the guiding rail 104, such that the first engaging portion 182 protrudes out of the housing 10 from the through hole 106. In other words, when the driving portion 120 is pressed, the driving member 12 drives the first engaging member 18 to move along the guiding rail 104 through a cooperation between the first rack portion 122, the gear mechanism 16, the second rack portion 140 and the second linking member 20, such that the first engaging portion 182 protrudes out of the housing 10 from the through hole 106. Finally, the two first engaging portions 182 enter the two engaging grooves 54 on the back of the electronic device 5, so as to fix the electronic device 5 on the support bracket 1.

After the driving portion 120 is pressed, the first resilient member 24 is stretched. Furthermore, the first linking member 14 will push the second engaging portion 220 of the second engaging member 22 while moving downwardly, such that the second engaging member 22 will rotate away from the first linking member 14 and the torsion spring 42 is twisted. Then, the second engaging member 22 will rotate toward the first linking member 14 and return to the original position due to a torque force generated by the torsion spring 42, such that the second engaging portion 220 is engaged with the engaging groove 142 of the first linking member 14, as shown in FIG. 12. Accordingly, it can be ensured that all of the components will not move or rotate with respect to each other. In this embodiment, the linking rod 30 enables the driving member 12 to move upward and downward smoothly without inclination.

In this embodiment, a number of teeth of the first gear 160 may be larger than a number of teeth of the third gear 164, such that a moving distance of the first engaging member 18 may be larger than a moving distance of the driving member 12. For example, if the number of teeth of the first gear 160 is 16 and the number of teeth of the third gear 164 is 8 the moving distance of the first engaging member 18 is twice as long as the moving distance of the driving member 12. In other words, the invention may change the gear ration between the first gear 160 and the third gear 164 to adjust the related moving distances of the first engaging member 18 and the driving member 12.

Figure 13:
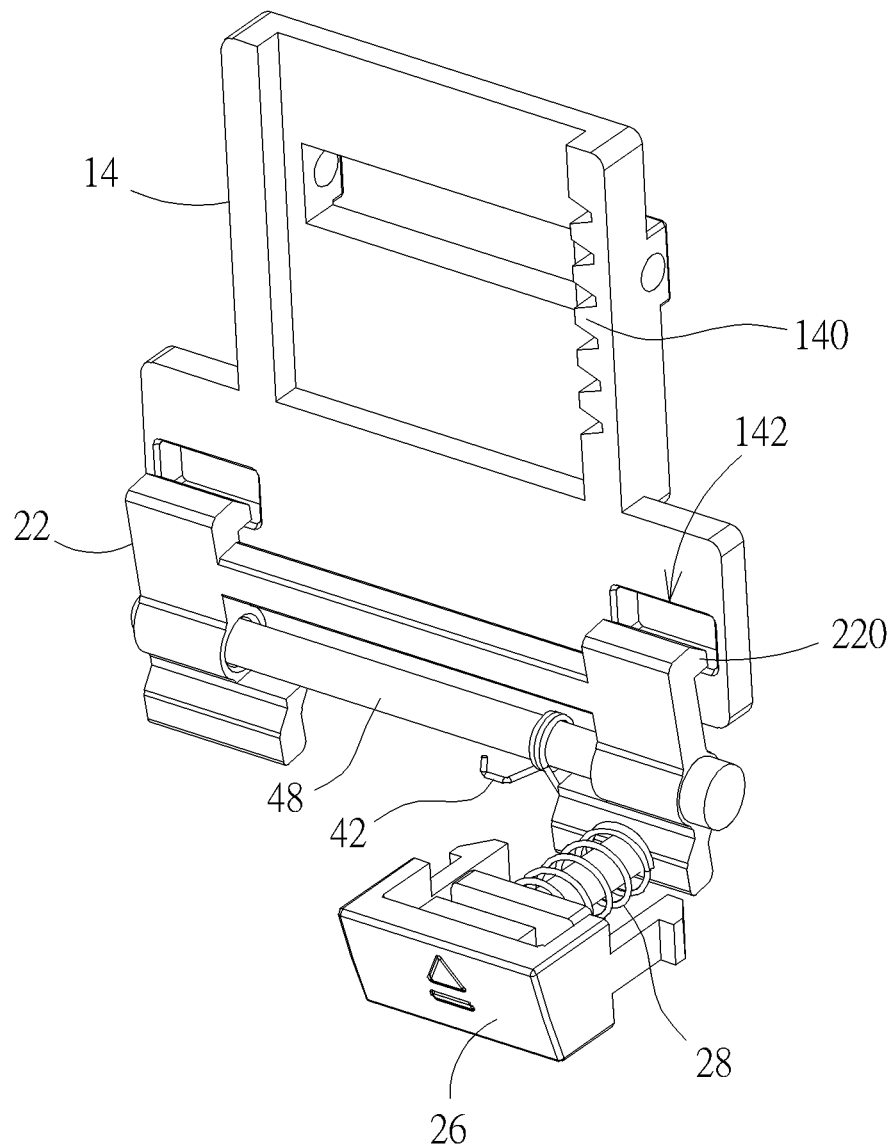
FIG. 13 is a perspective view illustrating the button shown in FIG. 12 being pressed.

Referring to FIG. 13, FIG. 13 is a perspective view illustrating the button 26 shown in FIG. 12 being pressed. When the user wants to detach the electronic device 5 from the support bracket 1, the user only needs to push the button 26, so as to push the second engaging member 22 to rotate away from the first linking member 14, such that the second engaging portion 220 is disengaged from the engaging groove 142. At this time, the stretched first resilient member 24 generates an elastic force for pulling the driving member 12 upwardly. Then, the driving member 12 drives the first engaging member 18 to move along the guiding rail 104 through the cooperation between the first rack portion 122, the gear mechanism 16, the second rack portion 140 and the second linking member 20, such that the first engaging portion 182 is ejected out of the engaging groove 54 on the back of the electronic device 5 and retracted into the housing 10 from the through hole 106. At this time, the user can detach the electronic device 5 from the support bracket 1. As mentioned in the above, the second engaging member 22 can rotate toward the first linking member 14 and return to the original position due to the torque force generated by the torsion spring 42. Similarly, after removing the press force from the button 26, the button 26 will return to the original position due to the elastic force generated by the second resilient member 28.

Figure 14:
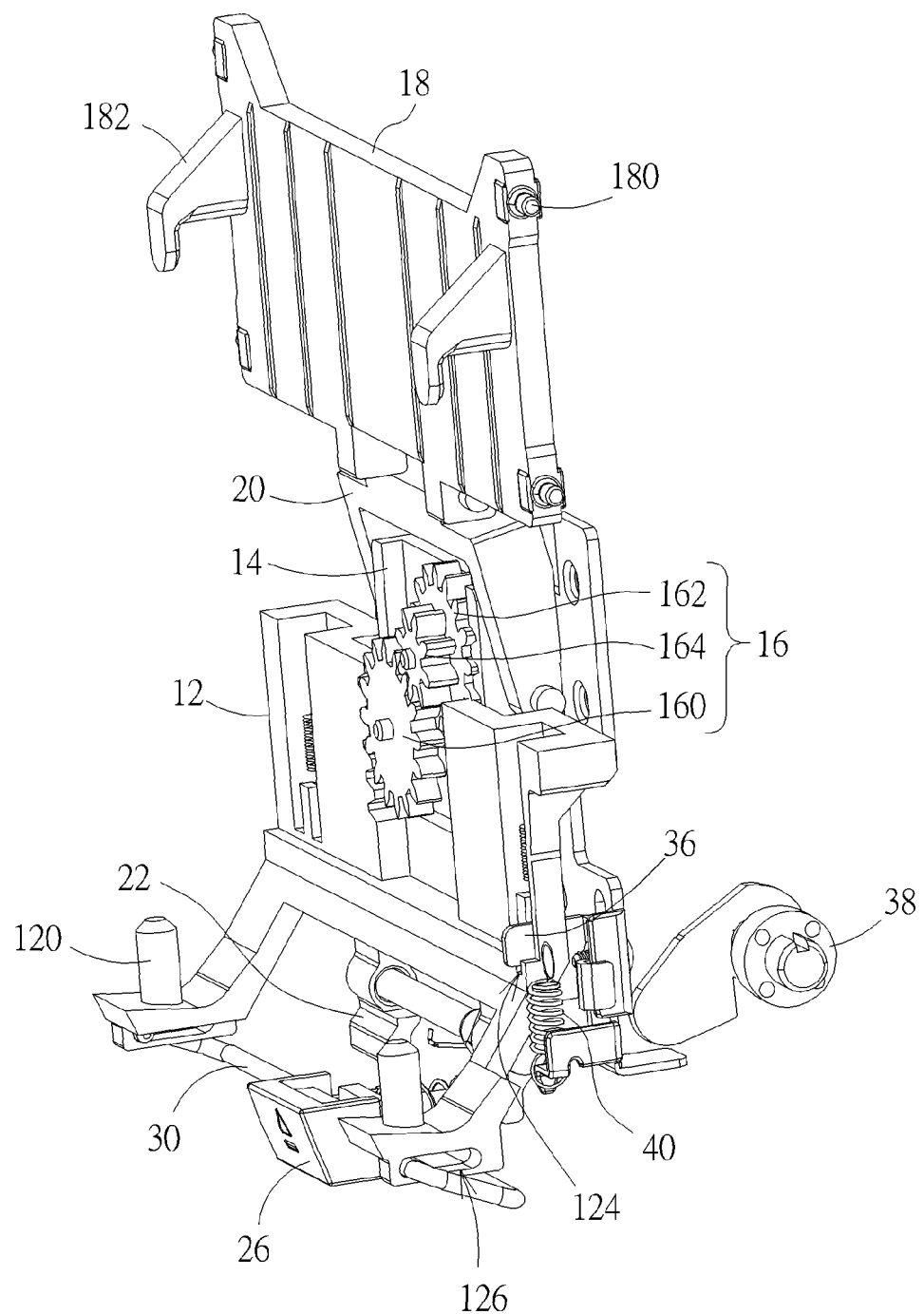
FIG. 14 is a perspective view illustrating the lock member and the lock recess of the driving member shown in FIG. 11 being engaged with each other.

Referring to FIG. 14, FIG. 14 is a perspective view illustrating the lock member 36 and the lock recess 124 of the driving member 12 shown in FIG. 11 being engaged with each other. In this embodiment, after the driving portion 120 is pressed, the rotating member 38 can be rotated to push the lock member 36 to move toward the lock recess 124, such that the lock member 36 is engaged with the lock recess 124, as shown in FIG. 14. In this embodiment, the back cover 102 has a lock hole 108 and one end of the rotating member 38 is located in the lock hole 108. The user can insert a key (not shown) into the lock hole 108 to rotate the rotating member 38, so as to engage the lock member 36 with the lock recess 124. After the lock member 36 is engaged with the lock recess 124, the driving member 12 cannot move upwardly. At this time, the user cannot press the button 26 to eject the first engaging portion 182 out of the engaging groove 54 on the back of the electronic device 5. Accordingly, the invention can prevent the electronic device 5 from being stolen. After the lock member 36 is engaged with the lock recess 124, the third resilient member 40 is stretched. The user can use the aforesaid key to rotate the rotating member 38 away from the lock member 36, such that the third resilient member 40 generates an elastic force for pulling the lock member 36 to move upwardly, so as to disengage the lock member 36 from the lock recess 124. At this time, the user can press the button 26 to eject the first engaging portion 182 out of the engaging groove 54 on the back of the electronic device 5 and then detach the electronic device 5 from the support bracket 1.

As mentioned in the above, when a user wants to attach the electronic device to the support bracket, he/she only needs to press the driving portion of the driving member by the bottom of the electronic device. Consequently, the first engaging portion of the first engaging member protrudes out of the housing from the through hole and then is engaged with an engaging groove on a back of the electronic device. Accordingly, the user can attach the electronic device to the support bracket rapidly. Furthermore, when the user pushes the button, the first engaging portion of the first engaging member is disengaged from the engaging groove on the back of the electronic device and then retracted into the housing from the through hole. Accordingly, the user can detach the electronic device from the support bracket rapidly. In other words, the support bracket of the invention allows the user to attach/detach the electronic device thereto/therefrom rapidly without any tools and is very convenient in operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A support bracket comprising:
  a housing having a guiding rail and a through hole, the guiding rail being located in the housing;
  a driving member movably disposed in the housing, the driving member having a driving portion and a first rack portion, the driving portion being exposed out of the housing;
  a first linking member movably disposed in the housing, the first linking member having a second rack portion and an engaging groove;
  a gear mechanism disposed in the housing, the gear mechanism meshing with the first rack portion and the second rack portion;

a first engaging member movably disposed in the housing, the first engaging member having a guiding portion and a first engaging portion, the guiding portion being disposed in the guiding rail;

a second linking member disposed in the housing, opposite ends of the second linking member being pivotally connected to the first linking member and the first engaging member, respectively; and a second engaging member rotatably disposed in the housing, the second engaging member having a second engaging portion;

wherein before the driving portion is pressed, the first engaging portion is retracted into the housing from the through hole; when the driving portion is pressed, the driving member drives the first engaging member to move along the guiding rail through a cooperation between the first rack portion, the gear mechanism, the second rack portion and the second linking member, such that the first engaging portion protrudes out of the housing from the through hole and the second engaging portion is engaged with the engaging groove.

2. The support bracket of claim 1, further comprising a first resilient member, opposite ends of the first resilient being connected to the housing and the driving member, respectively.

3. The support bracket of claim 1, further comprising a button movably disposed in the housing and used for pushing the second engaging member to rotate.

4. The support bracket of claim 3, further comprising a second resilient member, opposite ends of the second resilient member being connected to the button and the second engaging member, respectively.

5. The support bracket of claim 1, wherein the housing further comprises a front cover and a back cover.

6. The support bracket of claim 5, wherein the guiding rail is located in the front cover of the housing.

7. The support bracket of claim 1, wherein the guiding rail is curve-shaped.

8. The support bracket of claim 1, further comprising a linking rod rotatably disposed in the housing, opposite ends of the linking rod being slidably connected to opposite sides of the driving member, respectively.

9. The support bracket of claim 1, wherein the gear mechanism comprises a first gear, a second gear and a third gear, the first gear meshes with the first rack portion, the second gear meshes with the second rack portion, and the third gear is fixed on the second gear and meshes with the first gear.

10. The support bracket of claim 9, wherein a number of teeth of the first gear is larger than a number of teeth of the third gear.

11. The support bracket of claim 1, further comprising a positioning pillar protruding from the housing.

12. The support bracket of claim 1, further comprising an electric connector disposed on the housing.

13. The support bracket of claim 1, wherein the driving member further has a lock recess, the support bracket further comprises:

a lock member movably disposed in the housing; and a rotating member rotatably disposed in the housing;

wherein after the driving member is pressed, the rotating member is capable of being rotated to push the lock member to move toward the lock recess, such that the lock member is engaged with the lock recess.

14. The support bracket of claim 13, further comprising a third resilient member, opposite ends of the third resilient member being connected to the housing and the lock member, respectively.

15. The support bracket of claim 1, further comprising a torsion spring, the second engaging member being pivotally connected to the housing by a pivot, the torsion spring being sleeved on the pivot, opposite ends of the torsion being connected to the housing and the second engaging member, respectively.

* * * * *